July 11, 1933.  J. A. CAMERON  1,918,016

EJECTING AND DELIVERY DEVICE FOR WINDING MACHINES

Filed April 22, 1931  17 Sheets-Sheet 1

Inventor:
James A. Cameron
By his Attorney

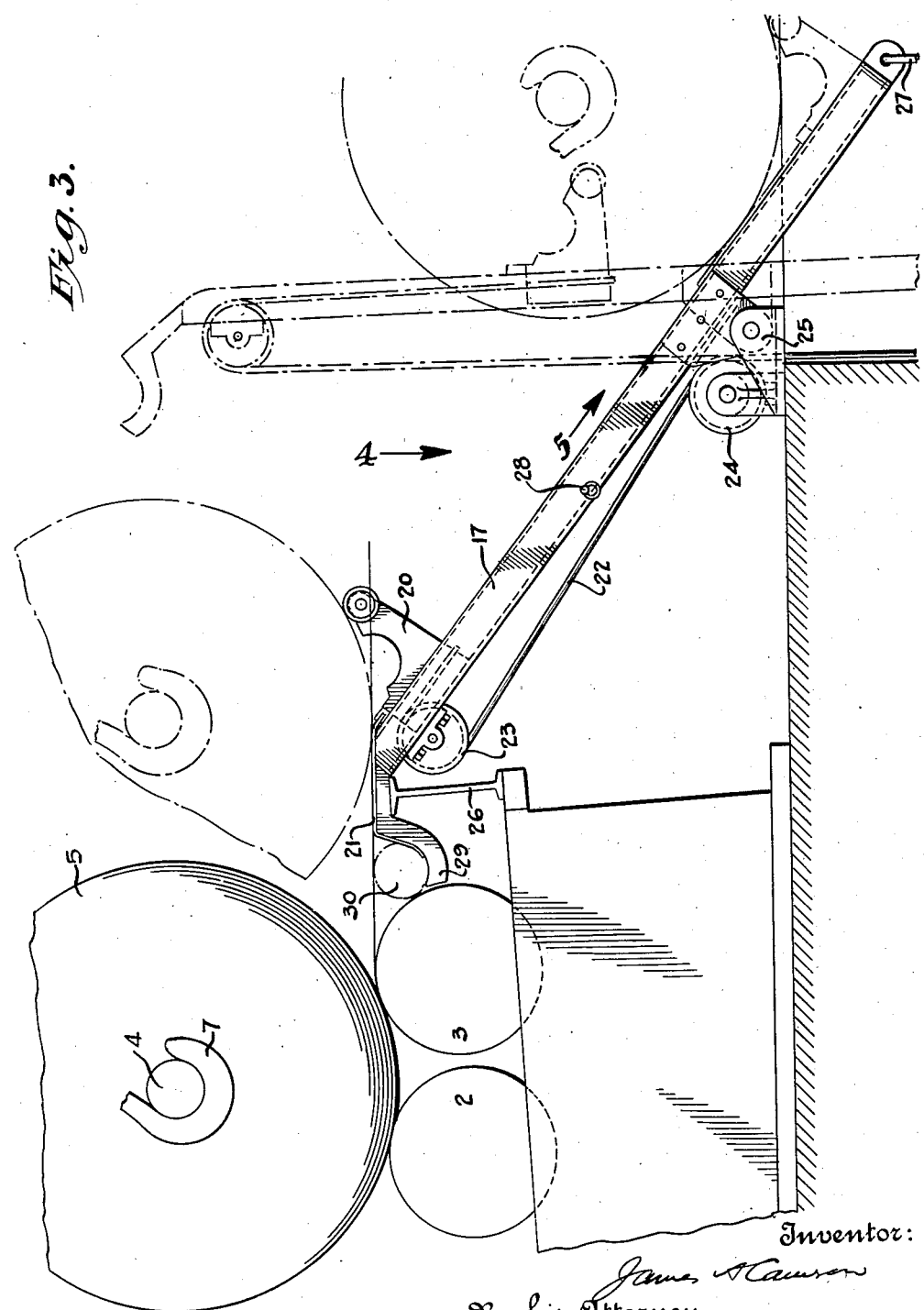

July 11, 1933.　　　J. A. CAMERON　　　1,918,016
EJECTING AND DELIVERY DEVICE FOR WINDING MACHINES
Filed April 22, 1931　　17 Sheets-Sheet 3
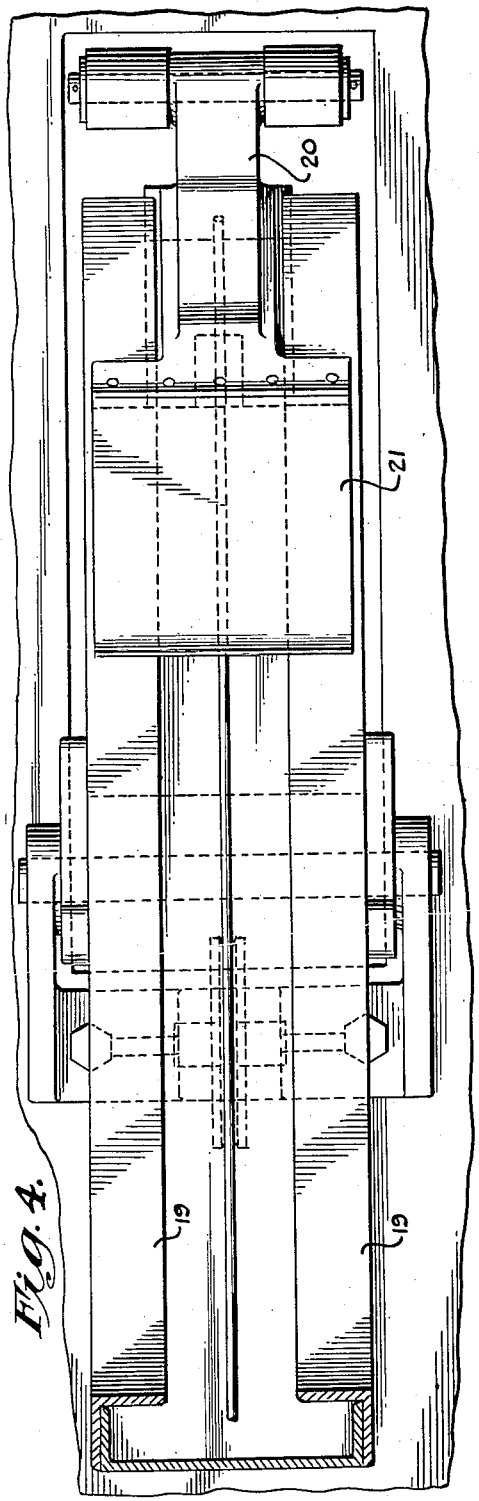
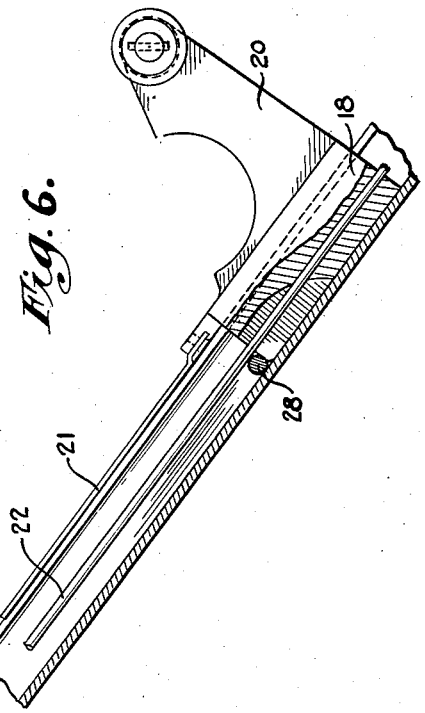
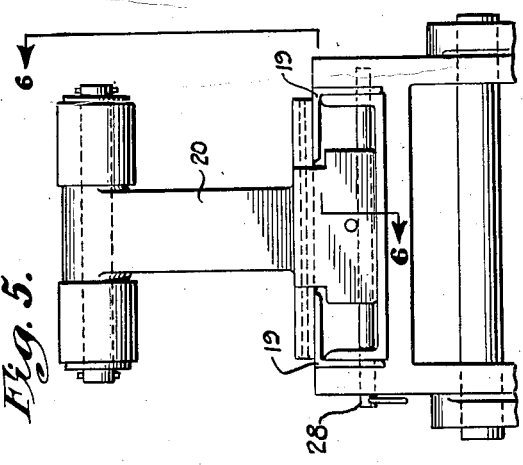
Inventor:
James A Cameron
By his Attorney July 11, 1933.  J. A. CAMERON  1,918,016
EJECTING AND DELIVERY DEVICE FOR WINDING MACHINES
Filed April 22, 1931  17 Sheets-Sheet 4
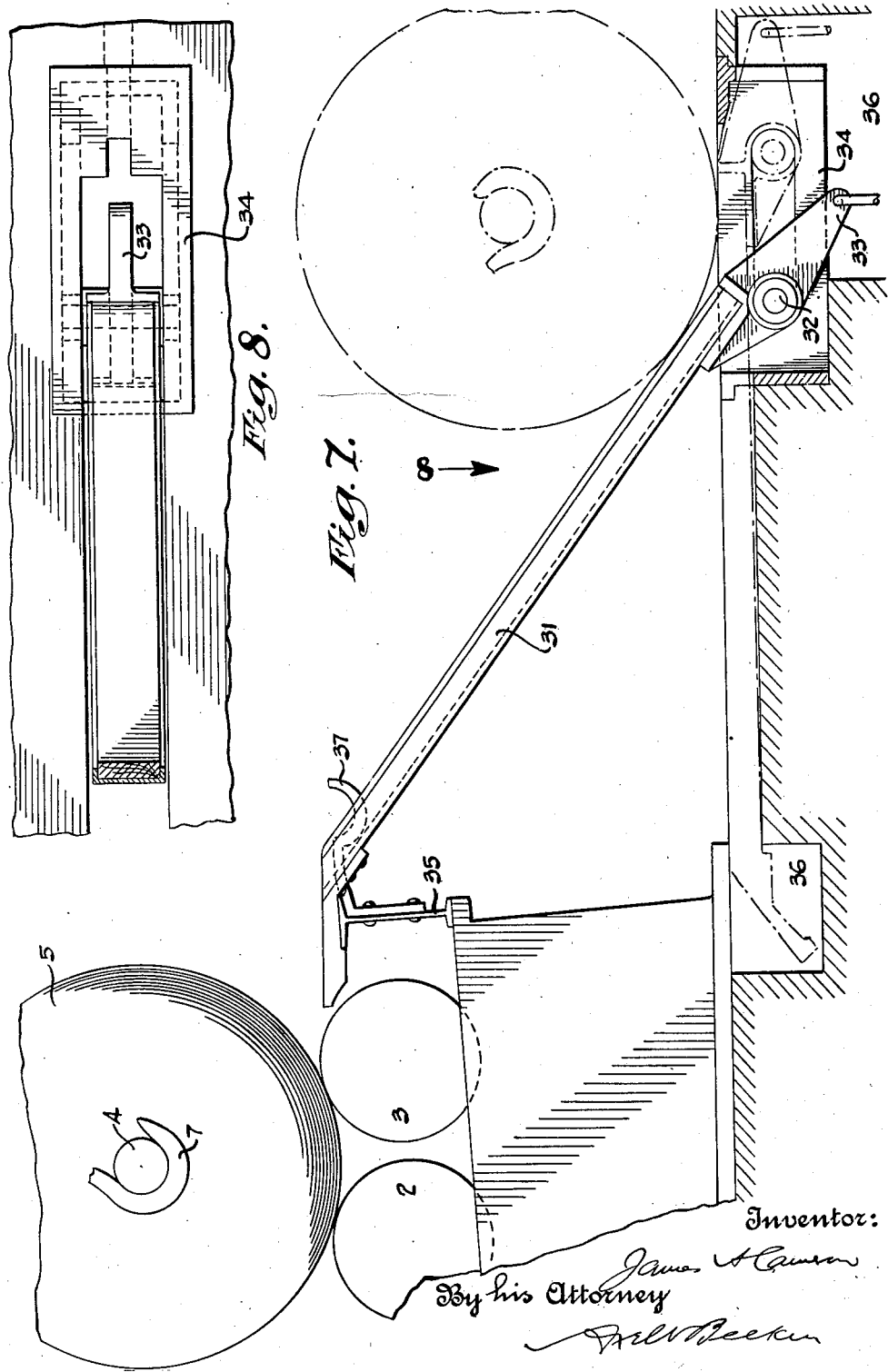

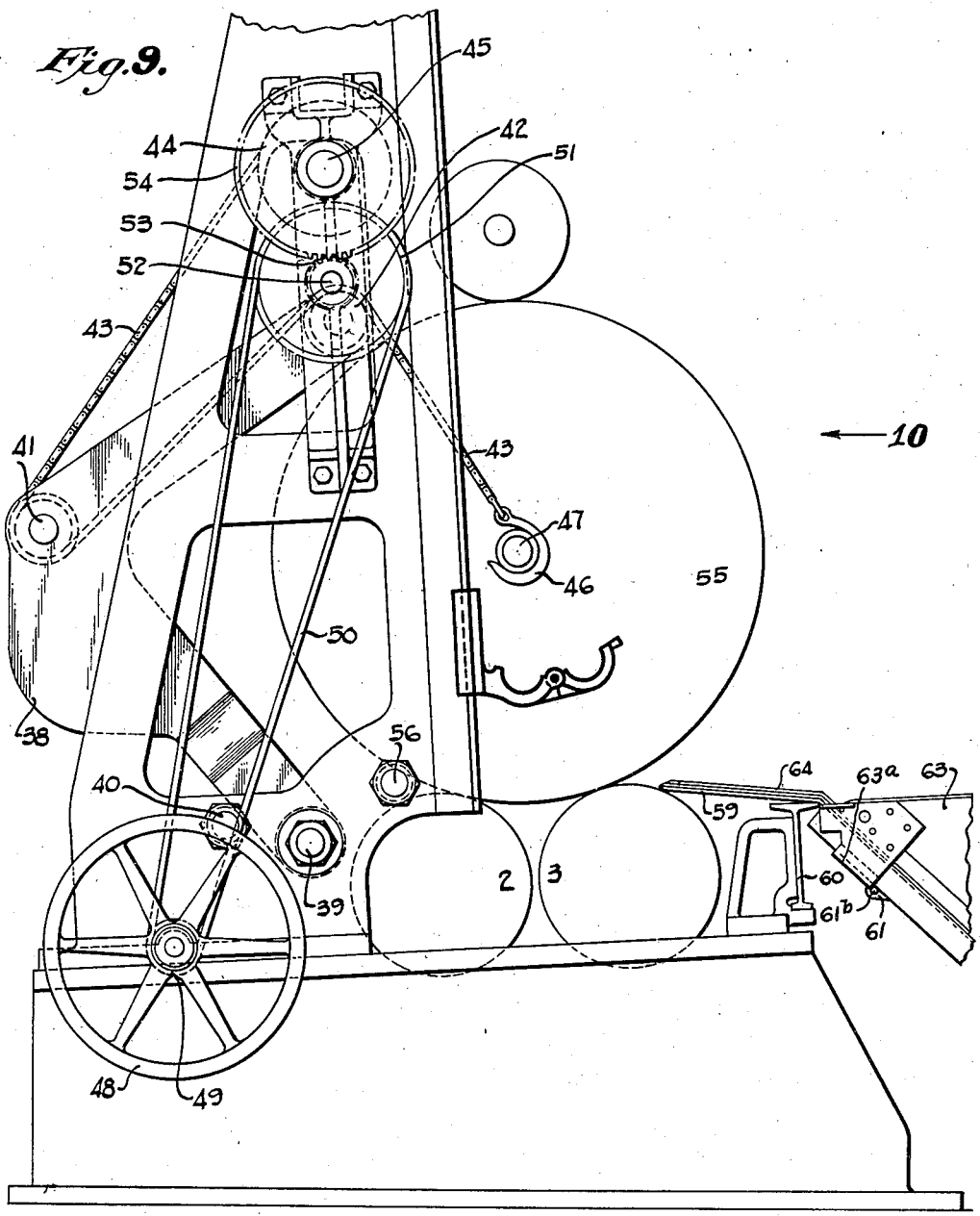

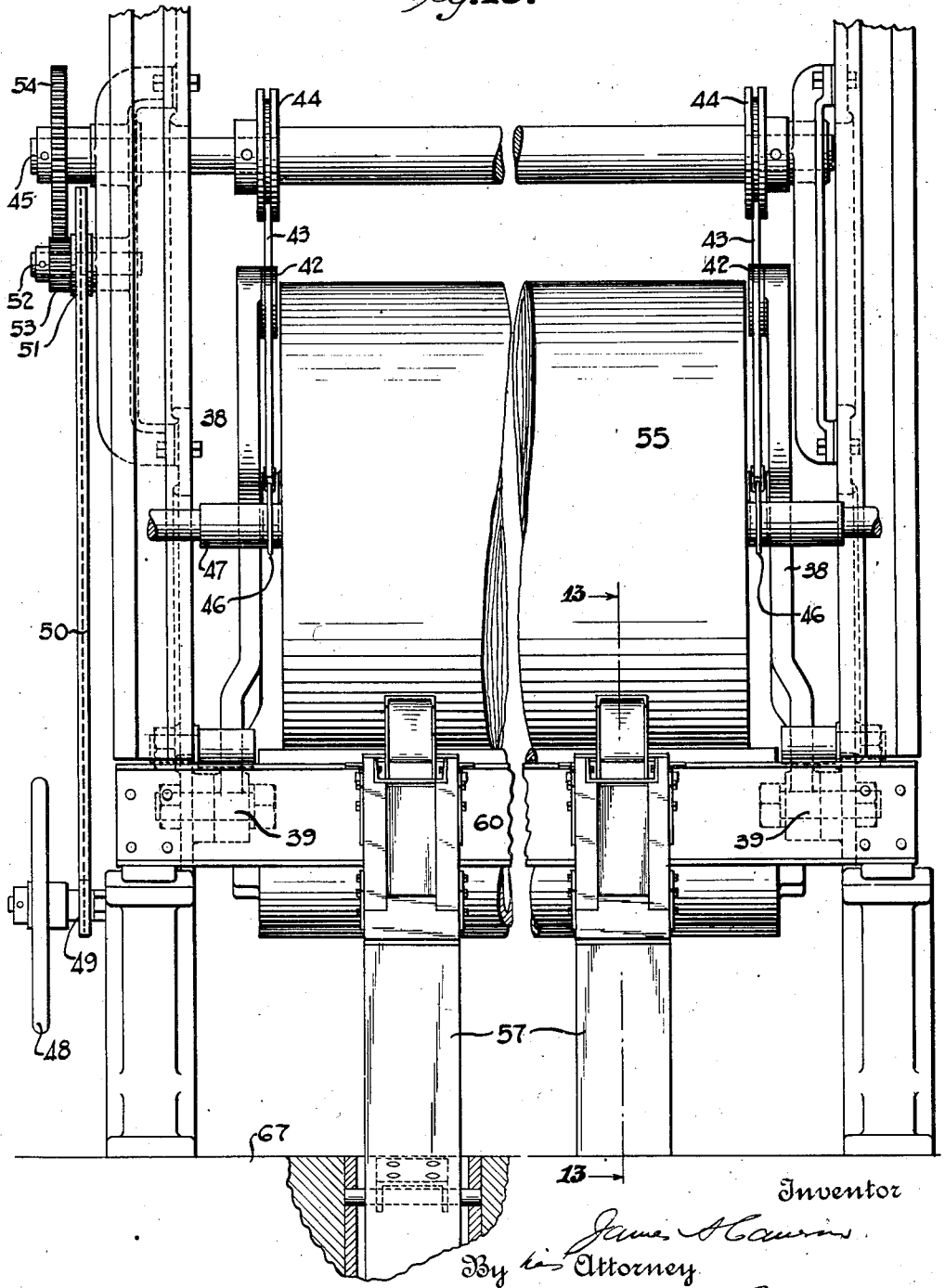

July 11, 1933.   J. A. CAMERON   1,918,016
EJECTING AND DELIVERY DEVICE FOR WINDING MACHINES
Filed April 22, 1931   17 Sheets-Sheet 7

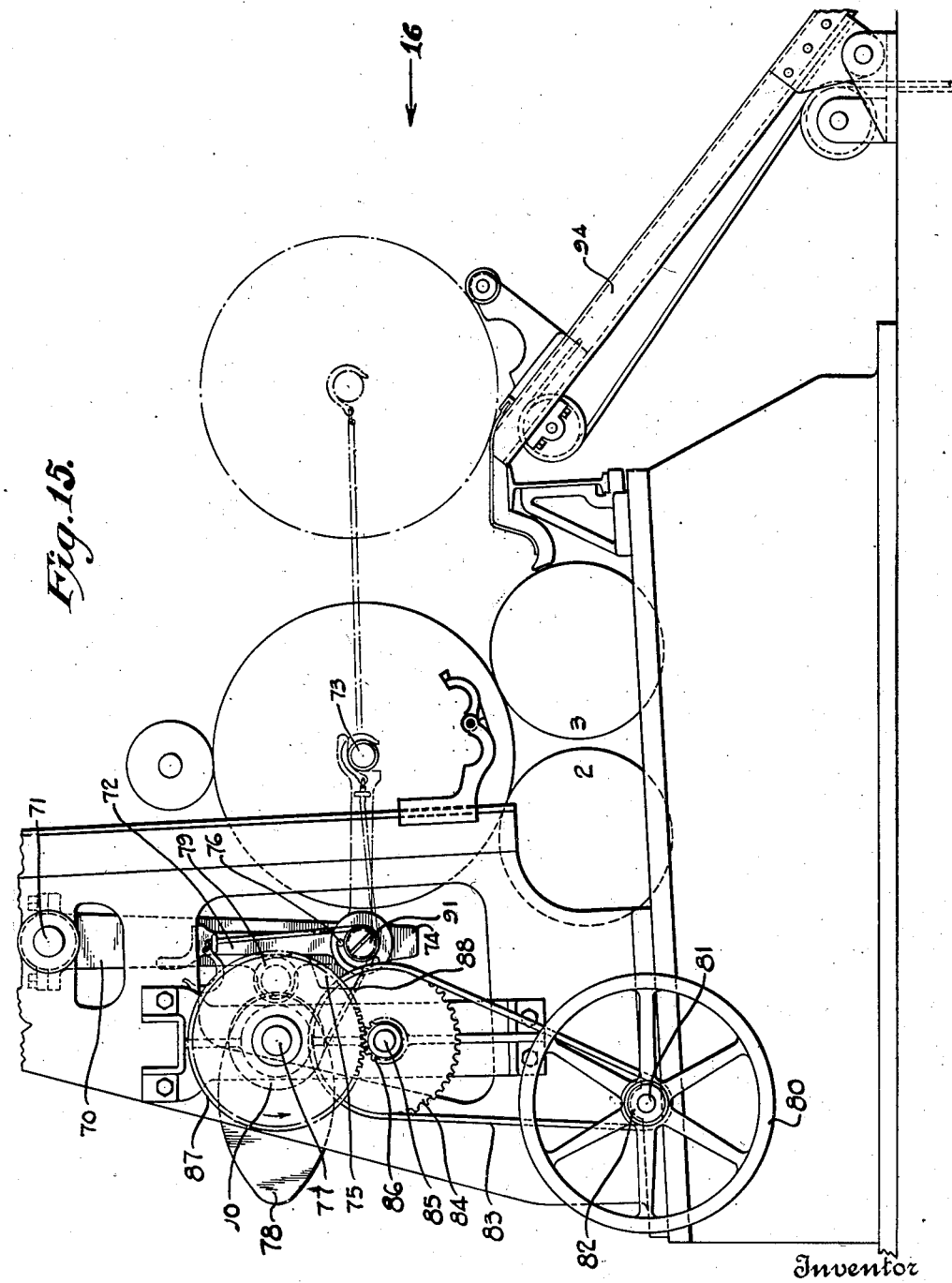

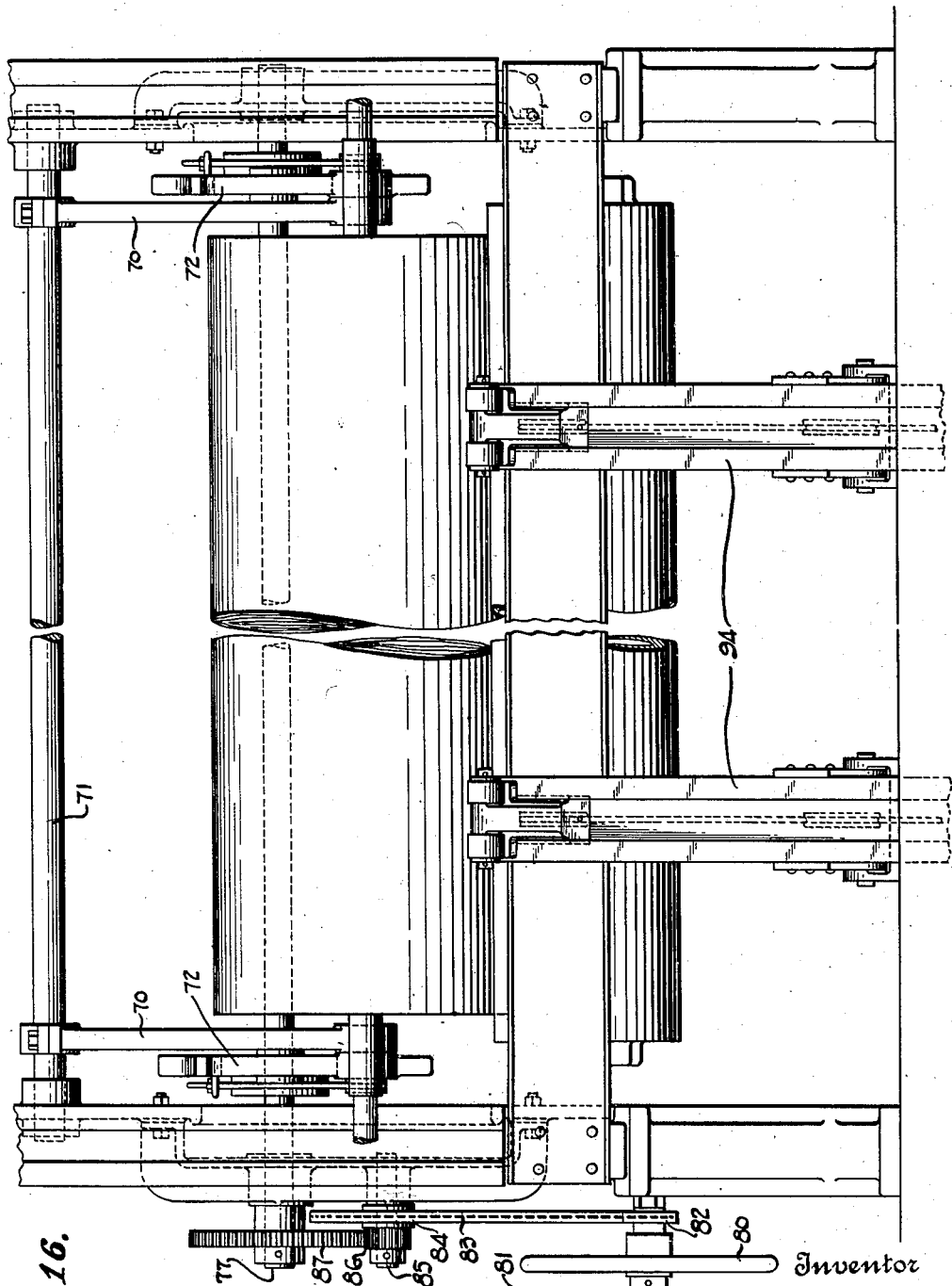

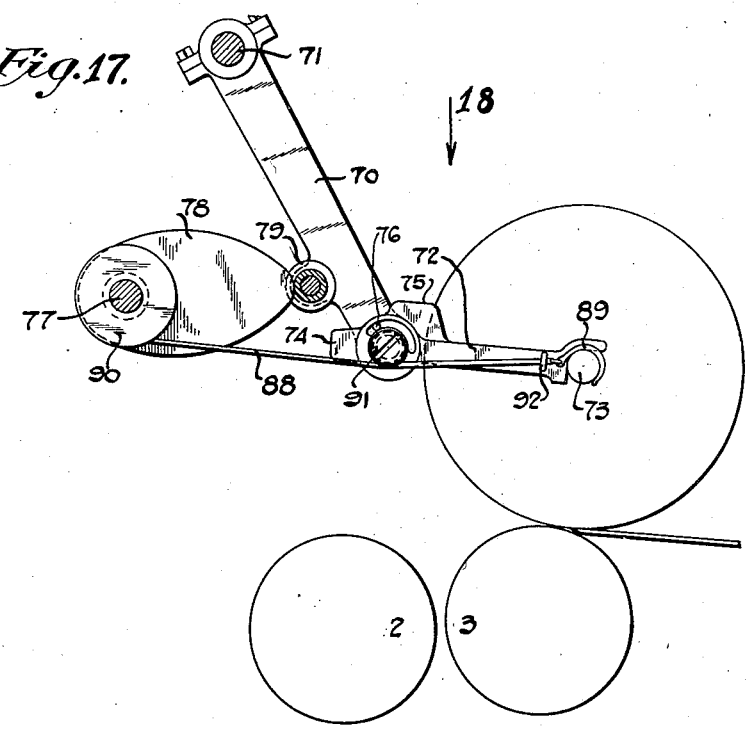
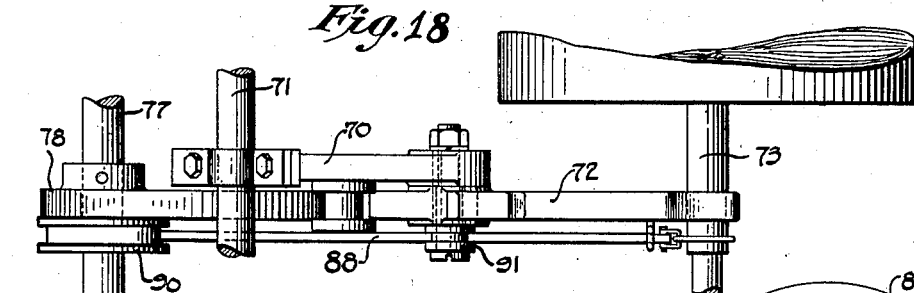
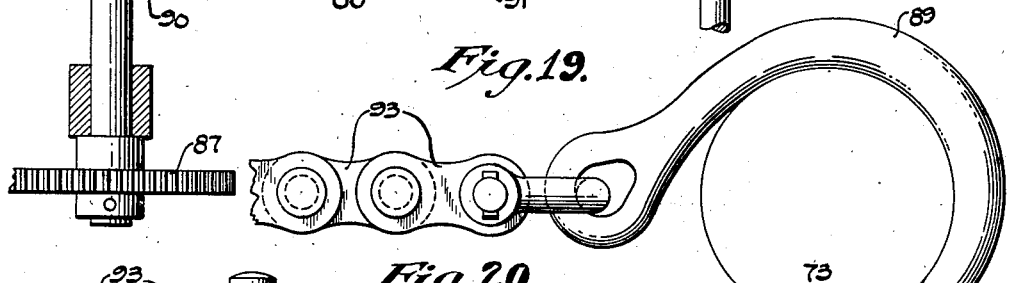
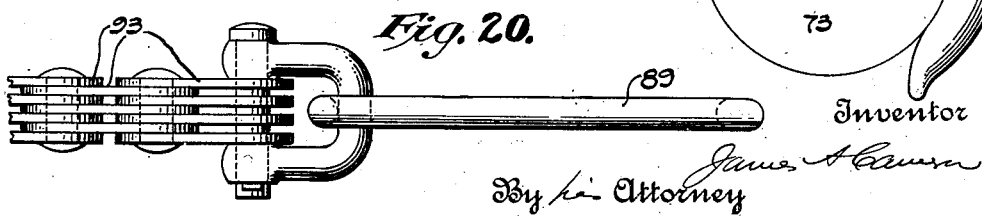

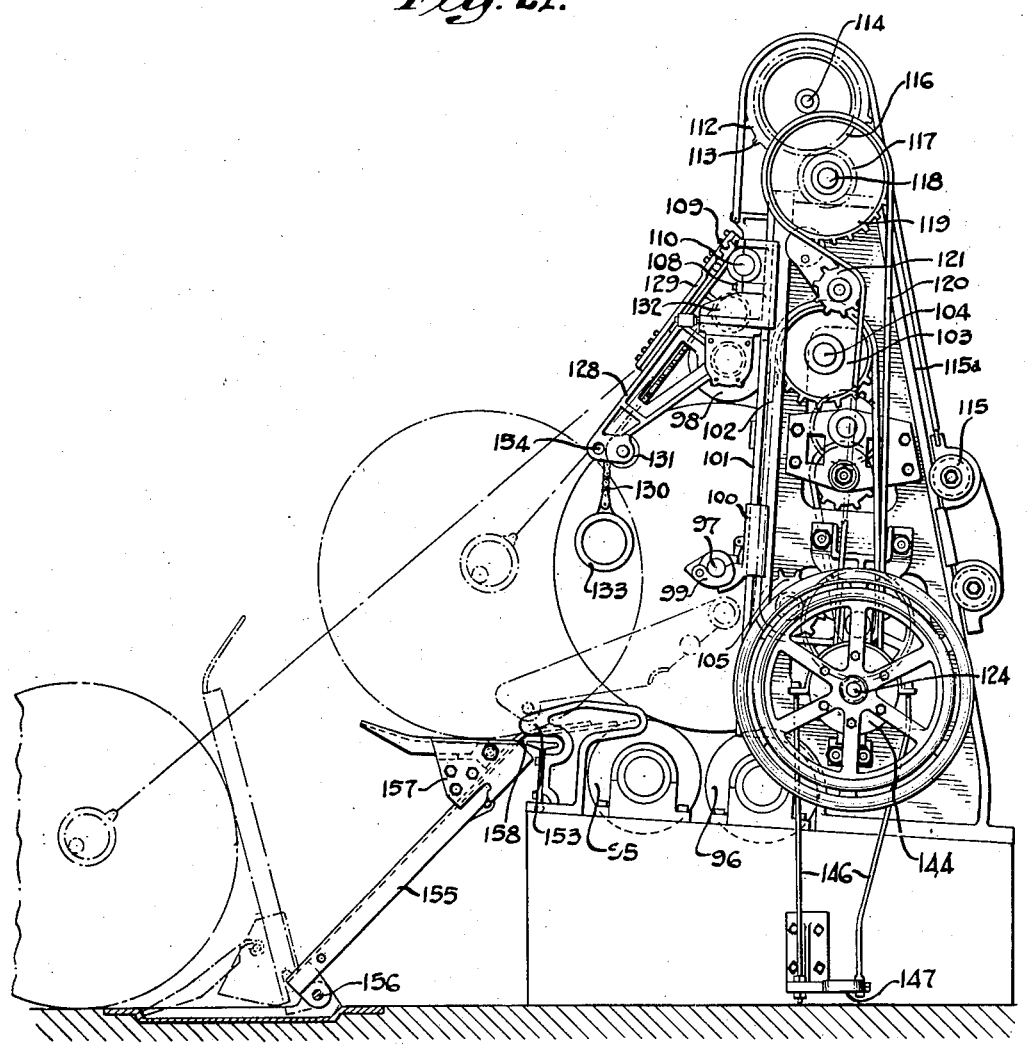

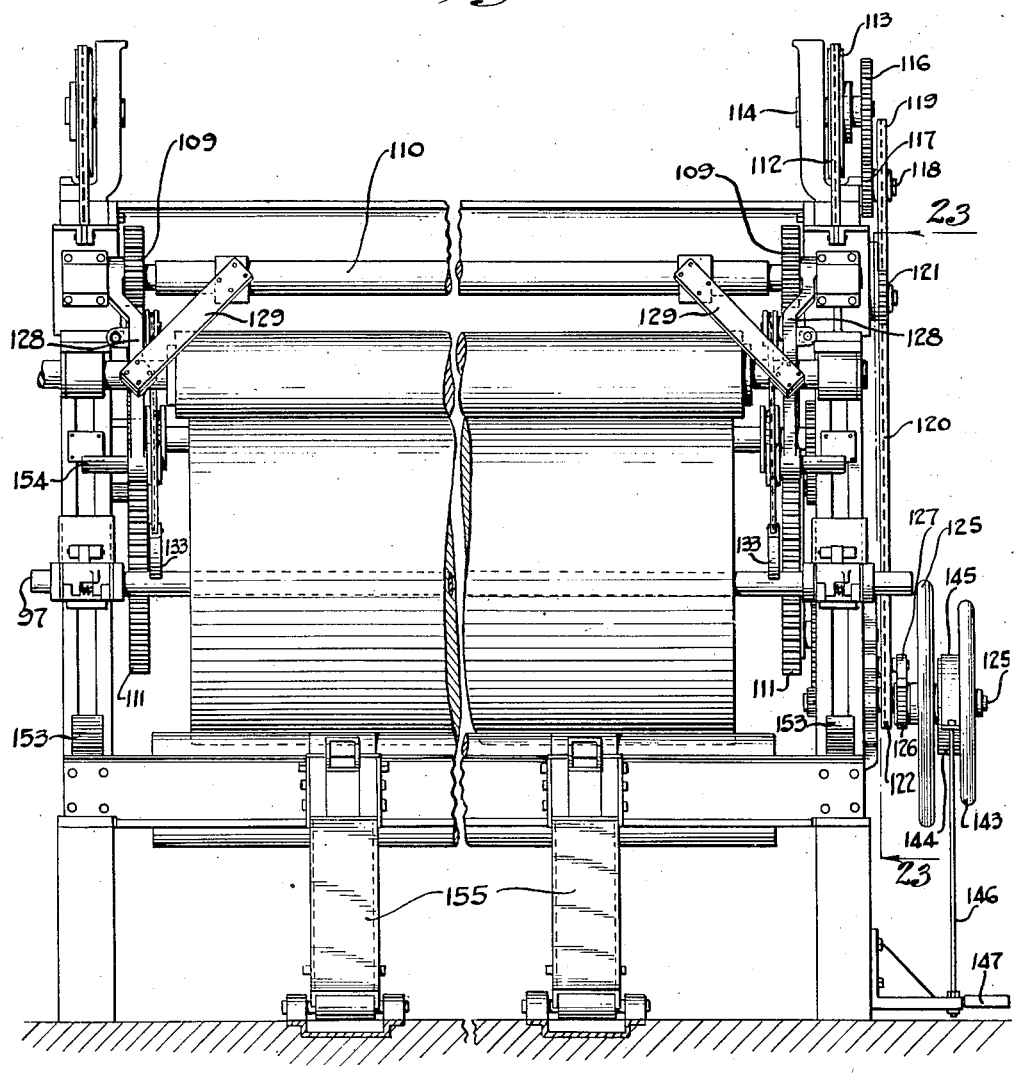

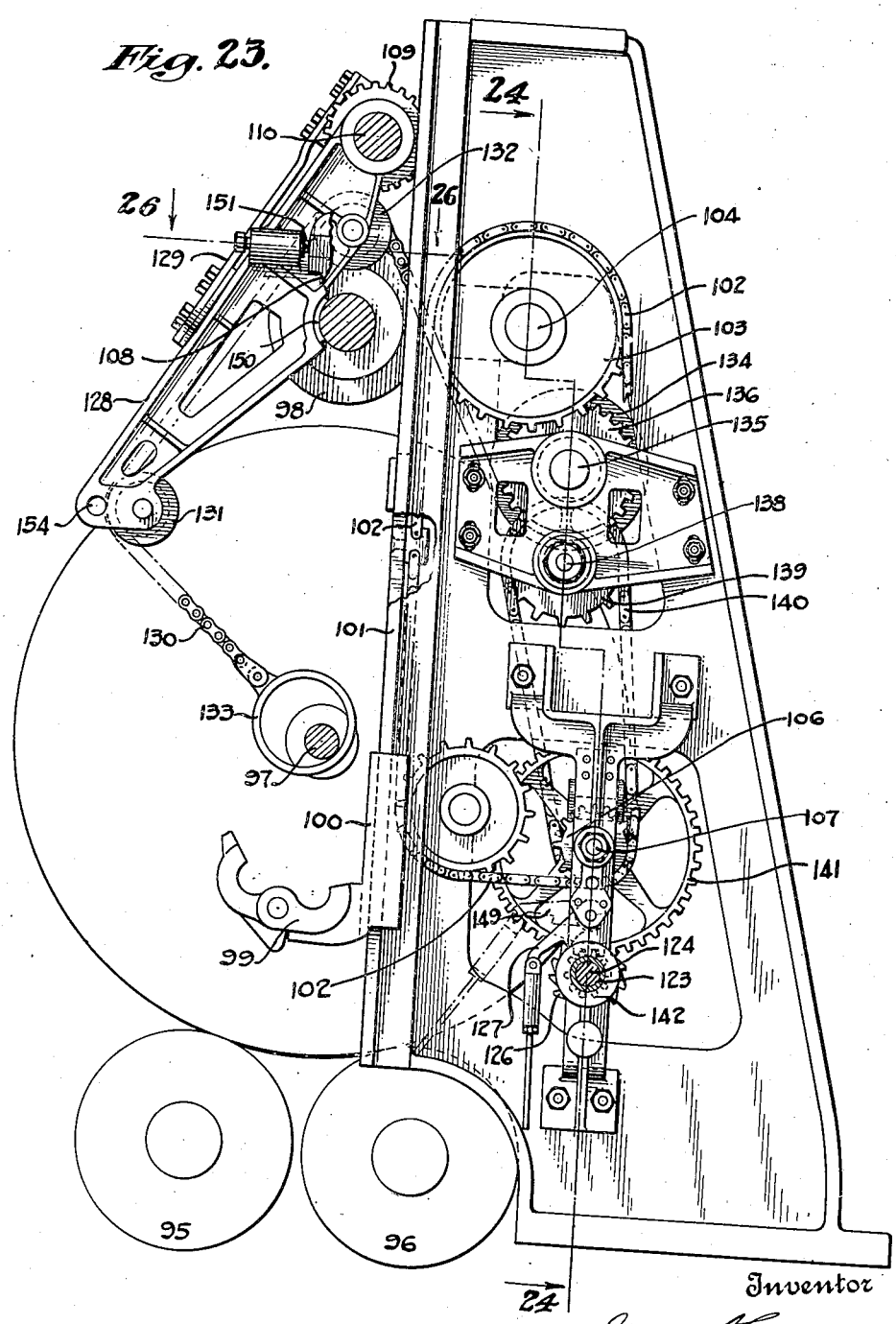

July 11, 1933.  J. A. CAMERON  1,918,016
EJECTING AND DELIVERY DEVICE FOR WINDING MACHINES
Filed April 22, 1931   17 Sheets-Sheet 15
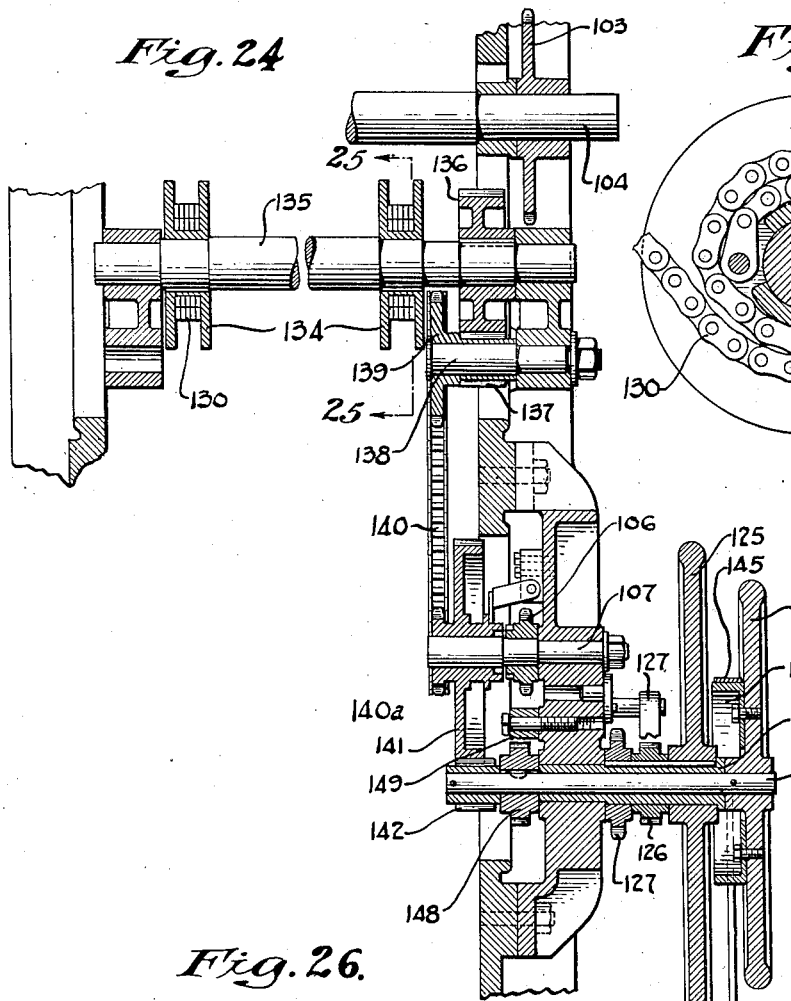
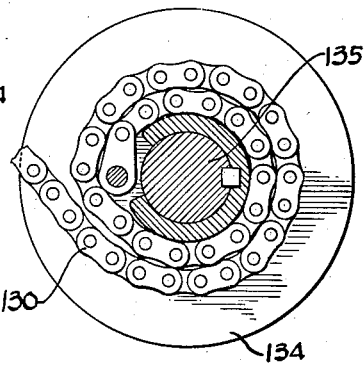
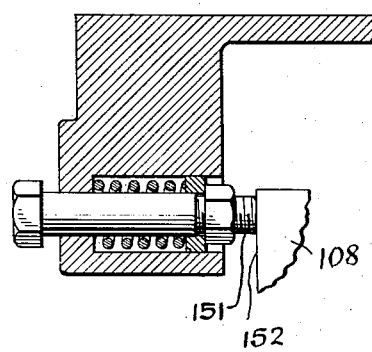

July 11, 1933. J. A. CAMERON 1,918,016
EJECTING AND DELIVERY DEVICE FOR WINDING MACHINES
Filed April 22, 1931 17 Sheets-Sheet 16

July 11, 1933.  J. A. CAMERON  1,918,016
EJECTING AND DELIVERY DEVICE FOR WINDING MACHINES
Filed April 22, 1931    17 Sheets-Sheet 17
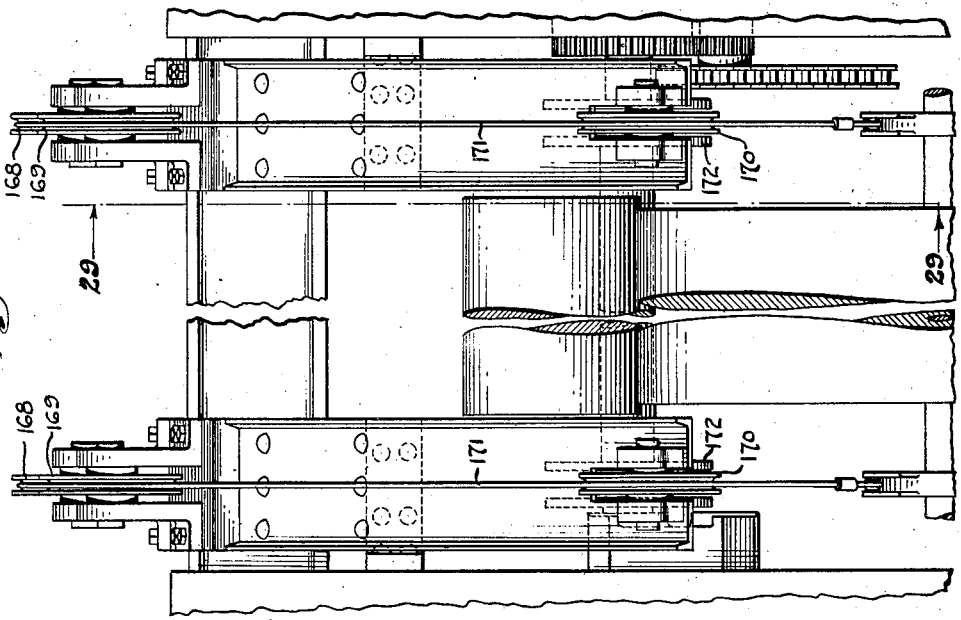
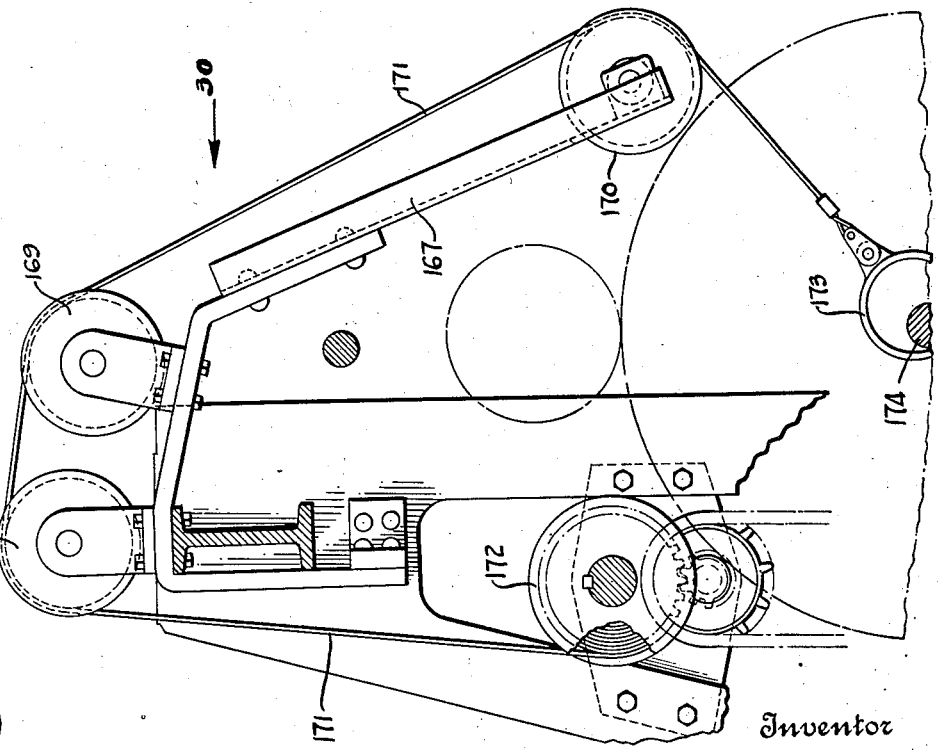

Patented July 11, 1933

1,918,016

UNITED STATES PATENT OFFICE

JAMES A. CAMERON, OF BROOKLYN, NEW YORK, ASSIGNOR TO CAMERON MACHINE COMPANY, OF BROOKLYN, NEW YORK, A CORPORATION OF NEW YORK

EJECTING AND DELIVERY DEVICE FOR WINDING MACHINES

Application filed April 22, 1931. Serial No. 531,864.

The present invention relates generally to ejecting or unloading devices, particularly of the type used in winding machines for winding webs of flexible material into rolls and has for its main object and feature the provision of means whereby a heavy roll of paper or other flexible material may be expeditiously and safely handled without injuring or marring the paper comprising the roll. This application is a continuation in part of application Ser. No. 482,264, filed September 16, 1930.

In the accompanying drawings the invention is disclosed in several concrete and preferred forms in which:

Fig. 3 is an enlarged detail view of the lower part of Fig. 2 showing some of the parts in different positions which they may occupy at different times;

Fig. 4 is a fragmentary top plan view, looking in the direction of arrow 4 of Fig. 3;

Fig. 5 is a detail view looking in the direction of arrow 5 of Fig. 3;

Fig. 6 is a vertical sectional fragmentary view substantially on the plane of line 6—6 of Fig. 5;

Fig. 7 is a view similar to Fig. 3 but showing a modified form of the invention;

Fig. 8 is a top plan view of part of Fig. 7, looking in the direction of arrow 8 of Fig. 7;

Fig. 9 is a view in side elevation of a modified form of the invention in which the biasing means are located at the rear of the machine;

Fig. 10 is an end view, partly broken away and in section, looking in the direction of arrow 10 of Fig. 9;

Fig. 15 is a view in side elevation of another modified form of the invention in which the roll is ejected by a thrusting movement;

Fig. 16 is an end elevation looking in the direction of arrow 16 of Fig. 15, with parts broken away and in section;

Fig. 17 is a view of some of the parts shown in Fig. 15 illustrating the ejecting movement;

Fig. 18 is a top plan view looking in the direction of arrow 18 of Fig. 17;

Figs. 19 and 20 are detail views of the flexible connections;

Fig. 21 is a view in side elevation of a modified form of the invention in which the ejecting mechanism is carried by the riding roller mechanism;

Fig. 22 is an end elevation, partly broken away and in section, looking in the direction of arrow 22 of Fig. 21;

Fig. 23 is an enlarged vertical sectional view substantially on the plane of line 23—23 of Fig. 22;

Fig. 24 is a vertical sectional view substantially on the plane of line 24—24 of Fig. 23;

Fig. 25 is a sectional detail view substantially on the plane of line 25—25 of Fig. 24;

Fig. 26 is a detail sectional view substantially on the plane of line 26—26 of Fig. 23;

Fig. 29 is a fragmentary view substantially on the plane of line 29—29 of Fig. 30 showing a still further modified form of the invention; and Fig. 30 is a view looking in the direction of arrow 30 in Fig. 29, parts being broken away.

Figure 1:
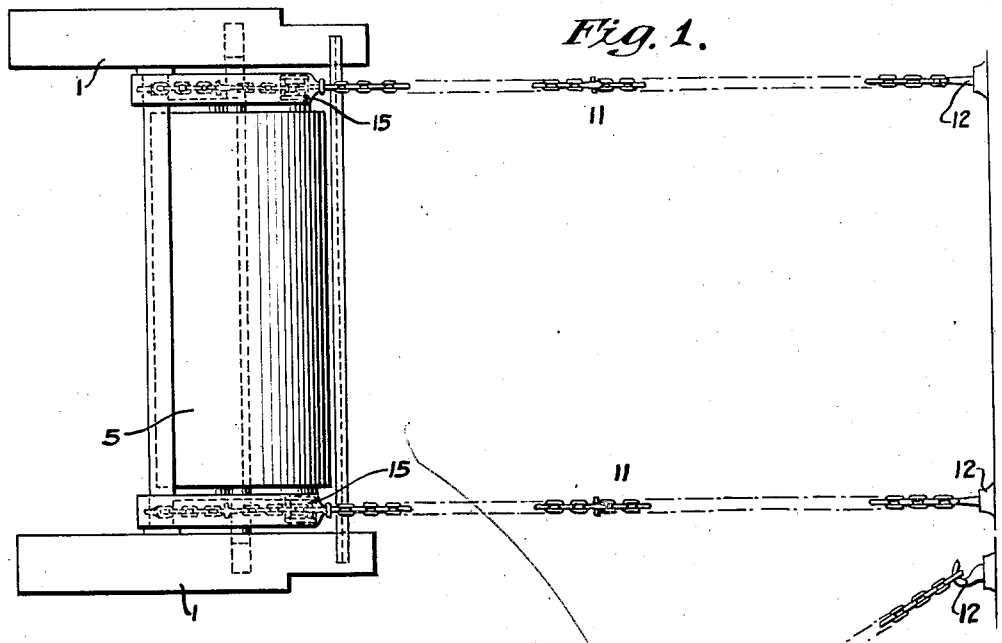
Fig. 1 is a top plan view of Fig. 2 with the way or skids, shown in said Fig. 2, omitted.
Figure 2:
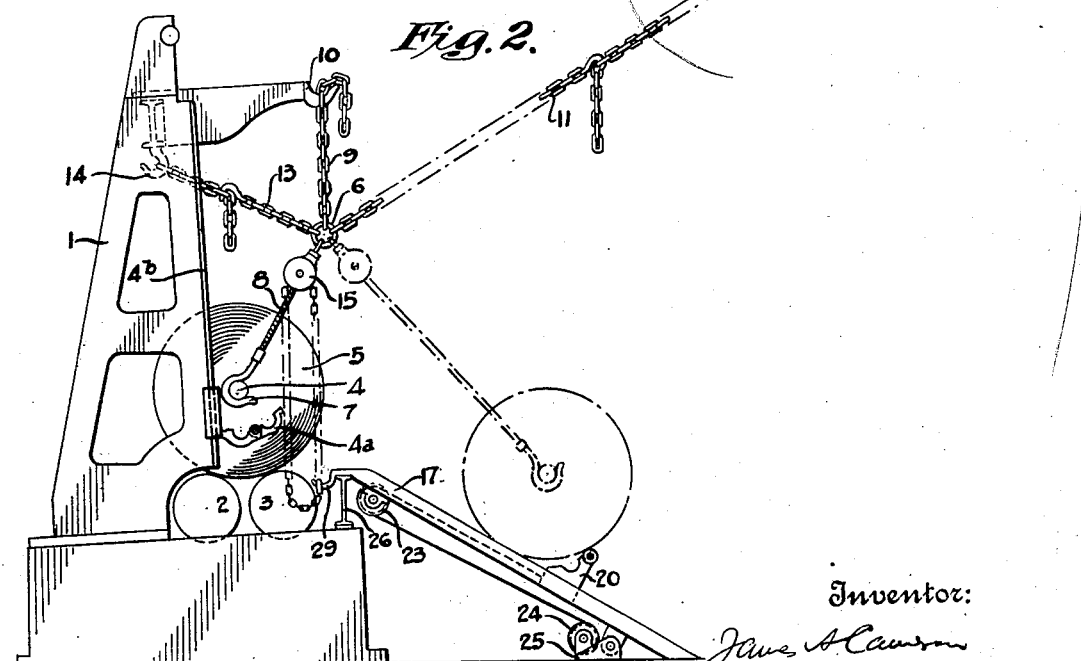
Fig. 2 is a view in side elevation, largely diagrammatic, of a winding machine and the ejecting or unloading means associated therewith.
Figure 11:
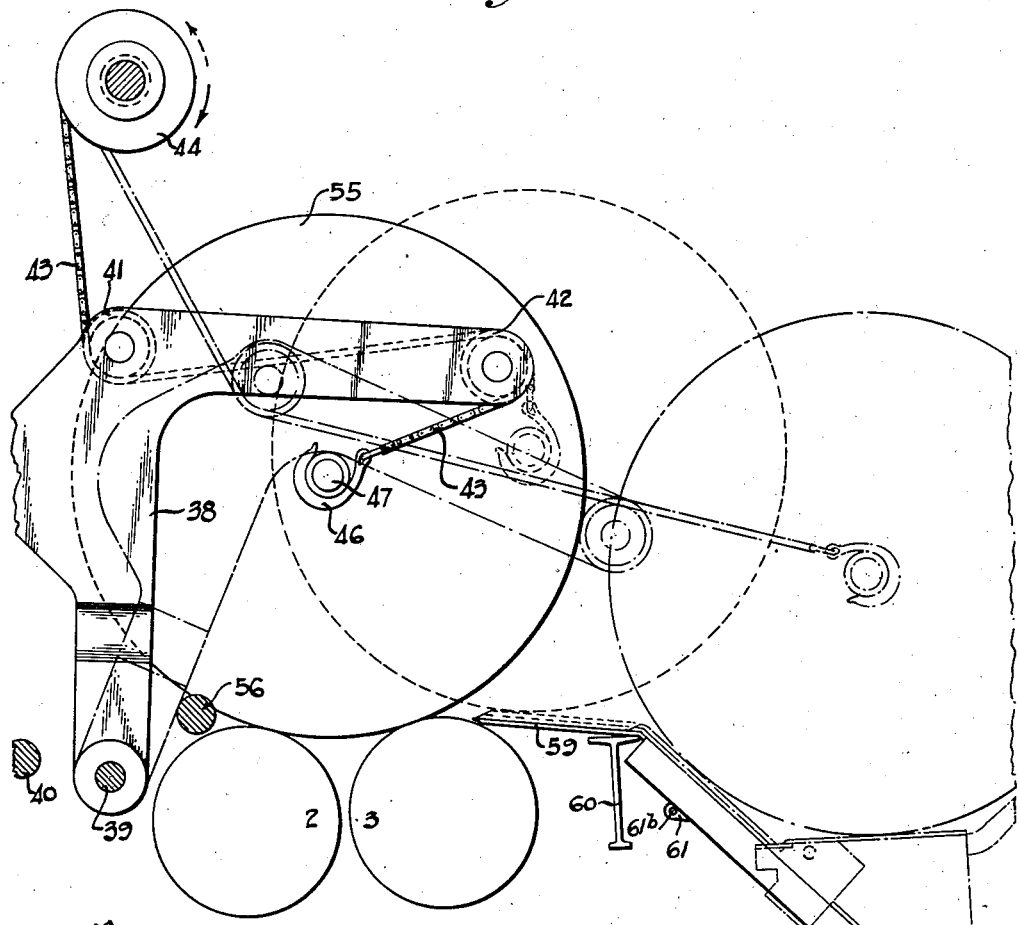
Fig. 11 is a diagrammatic view similar to Fig. 9 showing the steps of ejection of the roll.
Figure 12:
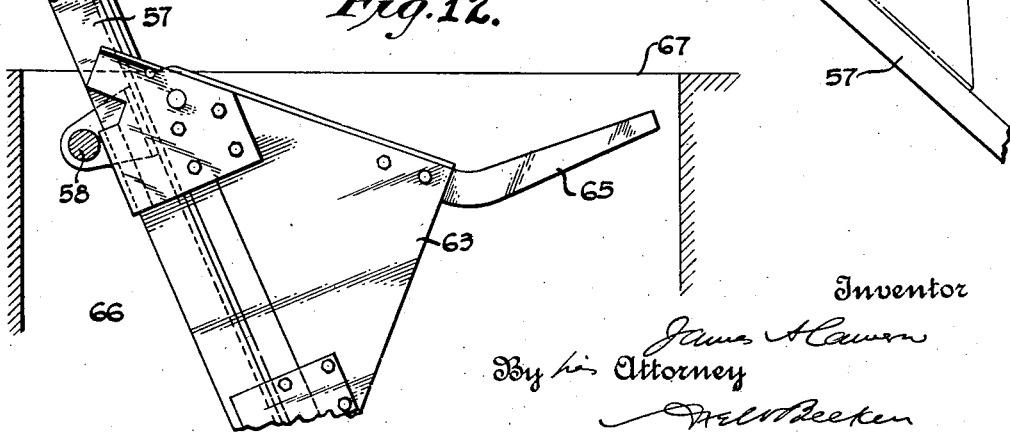
Fig. 12 is a detail view, partly in section, of the pivotal support for the ways or skids.
Figure 13:
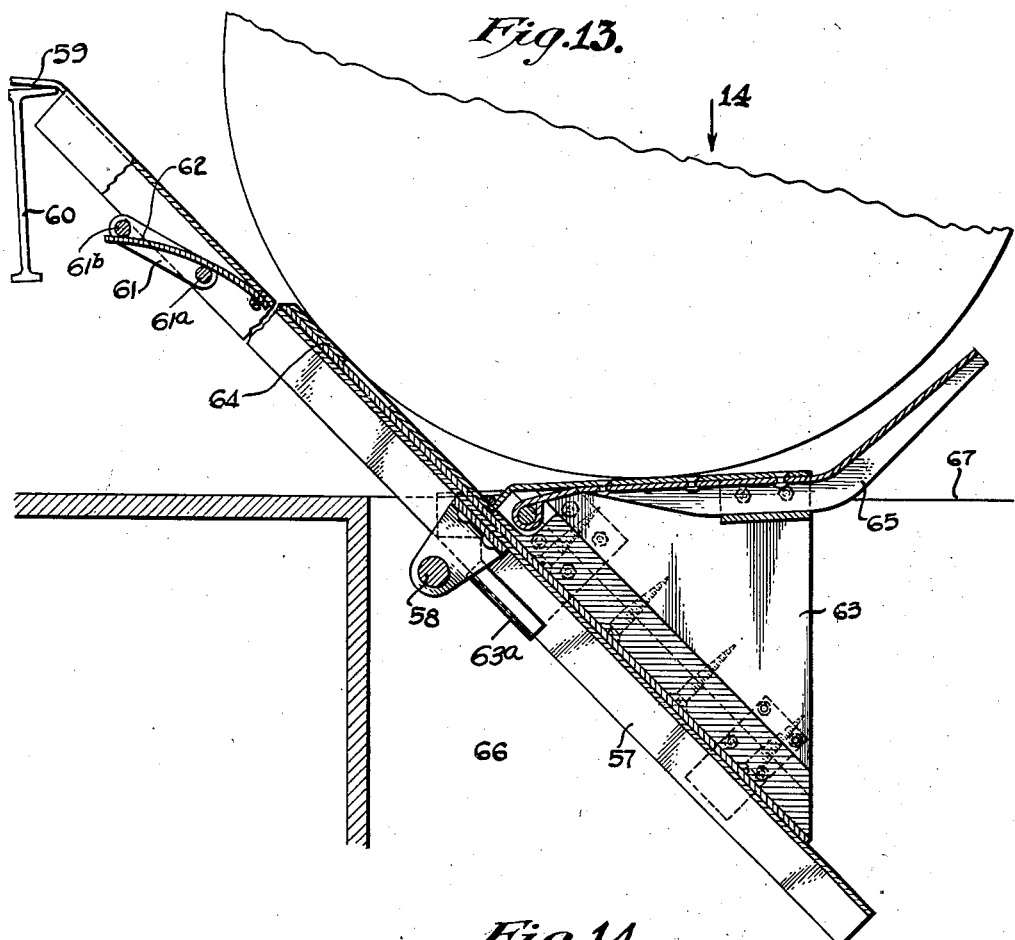
Fig. 13 is a vertical sectional detail view substantially on the plane of line 13—13 of Fig. 10.
Figure 14:
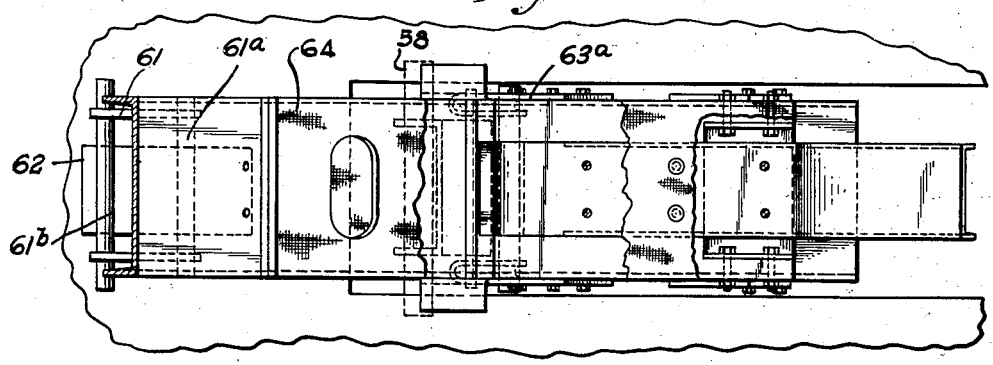
Fig. 14 is a plan view looking in the direction of arrow 14 of Fig. 13.

Referring first to Figs. 1 and 2, the numeral 1 indicates the framework of a surface winding machine which is characterized by the presence of two surface winding drums 2 and 3 spaced apart and rotating in the same direction. 4 indicates a core-engaging means or winding shaft in the valley between the drums on which wound material or roll accumulates during the winding operation, said winding shaft being carried by bearings 4ª displaceable in an upward direction on guides 4ᵇ, as the material accumulates, in a well-known manner.

Paper webs are now being made in very wide widths and, in winding machines that stand back of a paper making machine and therefore wind the paper into rolls of a length equal to the width of the web, the weight of the accumulated material is quite formidable. The result is that the ejection or unloading of the roll presents considerable difficulty, not only in the actual ejection or removal of the roll from between the drums that constitute the winding means but also in the control of the roll after it has left the valley between the drums. There is thus a double problem involved.

Heretofore one of the methods practiced in unloading the roll involved the use of overhead tackle that engages opposite ends of the winding shaft to thereby swing the roll out of the machine. The objection to this method is that the weight of the accumulated material, owing to the length of the roll, tends to bend or flex the winding shaft.

Another method suggested is to forcibly eject the roll by providing means that push against the shaft or the roll of material, said roll remaining in contact with the surface of one of the drums, and while this method prevents flexing of the winding shaft, no means have been provided for controlling the movement of the roll after it passes the crest of that drum over which it is being moved. Also, in devices where the ejector engages the roll of material there is a tendency in certain cases to injure the paper or surface of the roll.

Again, it has been proposed to move the bearings and guides that support the winding shaft and to thereby carry the roll over the surface of one of the drums, but obviously this method presents limitations in the extent of the control that can be exercised over the roll once it has left the winding means. Moreover it is not always desirable in machines of this type to move the actual bearings and/or guides of the winding shaft to effect an ejecting movement.

The main object and feature of the present invention is to overcome these various difficulties and to provide means for effectively ejecting the roll without injury to the latter or to the winding shaft and to adequately control the roll after it has passed over the crest of that drum over which it is being moved.

Biased means are used in Figs. 1 and 2 which consist of control members, here rings, 6 that are sustained in a plane above the drums and outwardly beyond the crest of one of said drums, together with suitable guys and ejecting members to be presently described. 7 indicate ejecting members or hooks that engage the opposite ends of the winding shaft, and which are flexibly connected by members 8 to the control members. Said control members, 6, are here sustained by vertical supporting means or dependent flexible members 9 conveniently passed over hooks 10 of the framework. 11 indicates guys that slant upwardly and outwardly and which are anchored at the upper ends as at 12 to a wall or other supporting medium, and which are connected at their lower ends to the control members. Additional guys as 13 may be employed, and such additional guys extend upwardly and inwardly, are anchored at their upper ends on hooks 14 and are connected at their lower ends to members 6. Suitable means are provided for exerting a pull on the flexible means or for taking up and paying out such flexible means, and it will be evident that various devices variously located may be employed for this purpose. I find a simple hoisting device convenient for this purpose, and there is indicated at 15 chain hoists of known construction that may be hand operated by members 16. It will be apparent from this that the flexible connections, indicated at 8, may be shortened or lengthened by the chain hoists, said hoists being here interposed between control members 6 and ejecting members 7.

When a roll is to be unloaded, bearings 4ª are opened and freed from the winding shaft, and members 7 are passed around the ends of the winding shaft, after which the hoist is actuated to take up the flexible connection. This action on account of the bias of the parts moves the roll upwardly and outwardly over drum 3, said roll being in contact with the surface of said drum, and eventually the roll passes to inclined way or skids 17. When the roll passes the crest of the drum the action of the hoist may be reversed and the flexible connection paid out so as to ease the roll down the outer surface of the drum and/or down the incline of the way as will be understood. The advantage of this construction is that the roll is removed gently from the winding drums, that the paper is not marred, that the winding shaft is not flexed, that no complex and expensive power apparatus need be employed, that the bearings are not removed from the machine, and that the roll is controlled at all times. Furthermore, as the length of the flexible connection can be adjusted as shown, the device can be readily modified to suit various sizes of rolls.

In connection with the foregoing, or independently thereof, a special construction of way or skids may be employed. One form of way to be so used is shown more particularly in Figs. 3 to 6 inclusive. One important feature of this part of the invention is the provision of means whereby rolls of different diameters, and therefore of different weights, will automatically, and without any adjustment being effected by the operator, tend to compensate for their own weight so as to thereby retard the descent of the roll on the way or skids. In the exemplification here given, the way or skids generally indicated by 17 is provided with a carriage 18 slidable on guides 19 and provided with an upstanding support 20. 21 indicates an apron of flexible material also mounted on the carriage but arranged to lie on the way. It will now be understood that when the roll of wound material or other object passes out of the machine it will rest on a cradle composed of the apron and support 20. The weight of the roll will therefore tend to increase the frictional resistance between the apron and the way and and will thereby retard the descent of the carriage, and it will be understood that the greater the weight, the greater the resistance. In addition to the foregoing, carriage 18 may also be counterweighted, and this is accomplished in the present instance by a flexible connection 22 that passes over sheaves 23 and 24, there being a counterweight (not shown) attached to the lower end of 22. Provision is also made to quickly bring the way into and out of operative position. 25 indicates a pivotal support for the way, whereby said way may be swung, at will, into an upright but inoperative position as indicated in dotted lines in Fig. 3, or into an inclined but operative position, as indicated in full lines in said figure, with its upper end resting on I-beam 26. If desired, such swinging movement of the way may likewise be counterweighted as by means of connection 27. Carriage 18 may be held, when inoperative, in a determined position as by means of latch 28. An especial feature of this construction resides in a holder 29 on the upper end of the way that extends between I-beam 26 and drum 3. In this holder may be placed a spare winding shaft 30, the wound material rolling over said spare shaft as it leaves the machine, which permits the operator to immediately insert a new winding shaft between the drums. One or more ways of the character indicated may be used, and if several are employed they may be mounted on a common rockshaft or be individually pivoted as will be apparent.

In Figs. 7 and 8 is shown still another way or skid construction. Here the way 31 is mounted on a pivot 32 and this pivot is on a horizontally slidable member 33 movable in guides 34. By these means, it will be understood, the way may, at will, occupy an inclined and operative position on support 35 or an inoperative and recumbent position. To admit of this construction, the floor may be recessed as at 36. Also, in this form of the invention, the holder, 37, for the spare winding shaft is mounted on support 35 and extends outwardly.

In Figs. 9 to 14 inclusive are shown a modified form of the invention in which the biasing means, instead of being located adjacent the drum over which the roll is moved as in Figs. 1 and 2, are located adjacent the other drum. As here shown, 38 indicates a biasing member pivotally supported at 39 in the side frames and normally resting against stop 40. Two members like 38 are provided, one on each side of the roll of wound material between the latter and the side frames of the machine. Each member 38 carries two idlers 41 and 42 over which pass flexible connections 43, which latter are wound up on sheaves 44 on shaft 45 and carry at their free ends hooks 46 to engage winding shaft 47. Rotation in either direction may be imparted to shaft 45. In the present instance, motion is derived from handwheel 48 carrying a pulley or sprocket 49 from which passes a belt or chain 50 to pulley or sprocket 51 on shaft 52, which latter carries a pinion 53 to engage gear 54 on shaft 45. When it is desired to unload the roll (55) winding shaft 47 is released from its bearings, hooks 46 are passed around said winding shaft, and shaft 45 is rotated in a clockwise direction, by the means previously described, thereby taking up flexible connection 43. The effect of this is first to move member 38 from the position shown in Fig. 9 to the position shown in full lines in Fig. 11. That is, member 38 is moved into its biasing position where it will be seen that hooks 46 are now in position to pull the roll out of the machine. Continued movement of shaft 45 in the same direction will then act to pull the roll into the dotted line position and will also move member 38 to a position where it encounters stop 56. The roll now having passed the crest of the drum, it can be held there or direction of rotation of shaft 45 can now be reversed to permit the roll to descend the ways 57 while being controlled by the flexible connection as indicated by the dot-and-dash lines in Fig. 11. The ways are here shown as being pivoted at 58 so as to be movable toward and away from the winding means, and are also here provided with a projection 59 that extends over I-beam 60. In this case also there may be a carriage 63 slidable on the ways and provided with a flexible apron 64 that rests on the ways, said carriage and apron receiving the roll and moving downward slowly by reason of the friction created between the ways and the apron by the weight of the roll. In this instance it will be perceived that carriage 63 is provided with an angular-shape supporting member 65 and pivot 58 is located in a pit 66, so that, when carriage 63 descends into said pit, ways 57 can be turned on pivot 58 or tilted backwardly and the roll thus be delivered on the floor level indicated at 67. In addition, a spring latch may be provided that will retain carriage 63 in its uppermost position when no roll is resting on the carriage, but which releases the carriage when the weight of the roll is brought to bear on the carriage and apron so that said carriage may be permitted to descend. This feature is shown more particularly in Figs. 9, 11, 13 and 14. As there indicated, ways 57 pivotally support at 61$^a$ a latch 61, said latch having a transverse bar or pin 61$^b$. 62 indicates a spring also carried by the ways which tends to urge pin 61$^b$ against the underside of ways 57. Carriage 63 is provided with cheek-plates 63$^a$ that pass beneath ways 57. When carriage 63 is pulled upwardly, said cheek-plates 63$^a$ strike pin 61$^b$ and move the latter in opposition to the tension of spring 62 so as to permit side-cheeks 63$^a$ to pass by, after which action pin 61$^b$ snaps behind cheeks 63$^a$ to sustain carriage 63 in the position shown in Fig. 9. When, however, the weight of the paper roll is brought to bear on the carriage, side-cheeks 63$^a$ will force pin 61$^b$ down against the tension of spring 62 thereby allowing the side-cheeks to pass by in a downward direction thus releasing carriage 63 and permitting it to descend.

In Figs. 15 to 20 is shown another modification of the invention in which the ejecting device serves to thrust the roll out of the machine. 70 indicates pendent arms pivoted at 71, at the lower ends of which are pivoted ejecting members 72 to engage winding shaft 73. Members 72 are provided with two counterweights 74 and 75. When the ejecting device is not in use it occupies the full line position shown in Fig. 15, the counterweights tending to retain it in this position and stop pin 76 preventing it from falling backwards. When, however, the roll is to be removed, members 72 are lowered into the dot-and-dash position shown in Fig. 15 in engagement with the winding shaft. Any suitable means may be provided to effect a thrusting movement of the ejecting device. In the present instance, 77 indicates a shaft carrying cams or eccentrics 78 to engage with rolls 79 of pendent arms 70. Any convenient means may be utilized to rotate shaft 77, but preferably the following construction is used: 80 indicates a handwheel on shaft 81 which latter carries a pulley or sprocket 82 from which extends a belt or chain 83 to a pulley or sprocket 84 on shaft 85. Shaft 85 carries a pinion 86 that meshes with a gear 87 on shaft 77. It will now be understood that, assuming members 72 to be in their lowered position, rotation of cams 78, by the means previously described, in one direction will cause said cams 78 to swing pendent arms 70 around pivots 71 and will thus thrust the roll out of the machine as indicated in Fig. 17. Suitable means, controlled by the same movement that effects ejection of the roll, are provided to restrain the roll once it passes over the crest of the drum. In the present instance, flexible connections 88 are provided having at their outer ends hooks 89 to engage the winding shaft. These flexible connections are wound on sheaves 90 conveniently mounted on shaft 77 and pass over guide rollers 91 coincidental with the pivot connecting pendent arms 70 and ejecting members 72. 92 indicates a confining means to keep hooks 89 adjacent the hooks on members 72. The flexible connections 88 may be of any suitable construction, but are preferably made of flat links 93 as indicated in Figs. 19 and 20. It will now be seen that, as the roll is being thrust out of the valley between the drums, flexible connections 88 will be unwound from sheaves 90 in timed relation with cams 78, and that, when the roll passes over the crest of the drum and if the movement of shaft 77 is continued in the same direction, said flexible connections will continue to be paid out as indicated in Fig. 15 and will control the roll as it descends on ways 94.

In Figs. 21 to 26 is shown a modification of the invention in which the ejecting and controlling means are carried by the riding or pressure roll mechanism. This is a very convenient method of controlling the roll in winding machines that have, in addition to winding drums 95 and 96 and winding shaft 97, a top pressure or riding roller 98. The general construction of a machine of this type may be as follows: winding shaft 97 is carried by bearings 99 mounted on slides 100 which move up and down on guides 101 of the framework. Slides 100 are connected to endless chains or flexible connections 102 that are trained around sprockets 103 on shaft 104, idler sprocket 105 and small sprocket 106 loose on shaft 107. It will thus be apparent that as wound material accumulates on the winding shaft it will rise with its bearings and the endless chain will travel around its sprockets. Manual means may be used to raise and lower the winding shaft through the transmission devices just described, but since such means are not necessary to an understanding of the present invention a description thereof is omitted. The riding roll mechanism consists here principally of a carriage 108 that slides on guides 101 of the framework, said carriage having mounted thereon riding roller 98 and pinions 109, on shaft 110, to engage stationary racks 111 to thereby maintain opposite ends of the riding roller at the same level. The riding roller follows the up and down movement of the winding shaft and the roll of material but is also capable of being moved up or down manually independently of the winding shaft. It is customary to counterweight the riding roll carriage and in the present instance flexible connections 112 extend from said carriage over sprockets 113 on stub shafts 114 and have connected to their other ends counterweights 115 sliding on inclines 115ª of the framework. It will be understood that by rotating one or both shafts 114 in one direction or the other, the riding roll mechanism can be raised or lowered. In the present instance the following means are utilized for this purpose: one of the shafts 114 carries a gear 116 meshing with pinion 117 on shaft 118, which latter carries a sprocket 119. 120 indicates a flexible transmission element passing over sprocket 119 and also over idler 121 and sprocket 122 fast on sleeve 123 loosely surrounding shaft 124. Mounted fast on sleeve 123 is handwheel 125, and it will now be understood that by turning said handwheel in one direction or the other the riding roller mechanism can be raised or lowered as a unit. 126 indicates a ratchet also fast on sleeve 123, and associated with this ratchet is a stop pawl 127 to prevent backward rotation of the gearing when it is desired to retain the riding roller mechanism in an elevated position when the riding roller is not resting on the roll of wound material. 128 indicates two arms conveniently pivoted on shaft 110 of the riding roller rack pinions and additionally braced by supports 129 also hung on said shaft 110. Arms 128 constitute a biasing member for flexible connections 130 and to this end carries two sheaves or sprockets 131 and 132. Flexible connections 130 carry at their outer ends hooks or rings 133 that engage the winding shaft and are trained over sprockets 131 and 132 and pass thence to pulley 134 on shaft 135. It will now be apparent that by rotating shaft 135 in such direction as to take up flexible connections 130 the roll will be pulled out of the valley between the drums, and that, after the roll has passed over the crest of drum 95, rotation of shaft 135 may be reversed to pay out flexible connections 130 to thereby lower said roll and at the same time to retard its downward descent by means of said connections 130. The means to rotate shaft 135 are as follows, in the present instance: shaft 135 carries a gear 136 meshing with pinion 137 on shaft 138, which latter carries a sprocket 139 from which passes a chain 140 to sprocket 140ª loose on shaft 107. Moving with sprocket 140 is a gear 141 that meshes with pinion 142 on shaft 124. Mounted on shaft 124 is a handwheel 143, and it will now be clear that by turning handwheel 143 in one direction or the other flexible connections 130 may be taken up or paid out. 144 indicates a brake drum conveniently attached to handwheel 143, and associated with this brake drum is a brake band 145 controlled by rods 146 and foot pedal 147 whereby when lowering the roll a braking pressure may be applied so as to retard movement of the transmission means. Also, if desired, a ratchet 148 may be carried by shaft 124 with which may be associated a stop pawl 149 to retain the parts, including the roll, in any desired position. It will be observed that, during the ejecting action, arms 128 rest with surfaces 150 against the shaft of pressure roll 98. It is, however, inadvisable to have the weight of the ejecting mechanism against the riding roll shaft when said riding roller is performing its function as a riding roller in contact with the roll of wound material and there is therefore provided a spring-pressed plunger 151 on arms 128 that bears against an abutment 152, on the riding roller mechanism so that when tension is relaxed on flexible connections 130 said spring-pressed plunger automaticaly lifts the ejector mechanism out of contact with the shaft of the riding roller. Also, at the beginning of the winding operation when the winding shaft and the top pressure roll occupy their lowermost positions, arms 128 will come in contact with cams 153 to thereby keep the ejecting device off the drums, arms 128 being for that purpose provided with pins 154. From the foregoing it follows that the operator can stand at one station and by manipulating handwheel 125 he can raise and lower the riding roller mechanism and by manipulating handwheel 143 (concentric with the other one) he can take up or pay out flexible connections 130 and control unloading of the roll.

Figure 27:
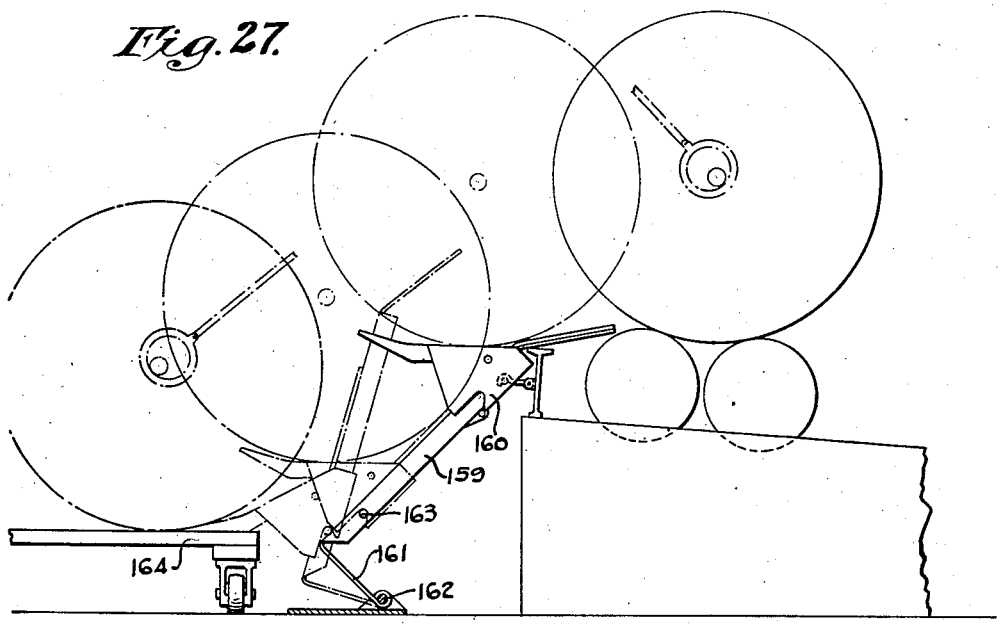
Figs. 27 and 28 are diagrammatic views of various means of delivering the roll outside of the machine.
Figure 28:
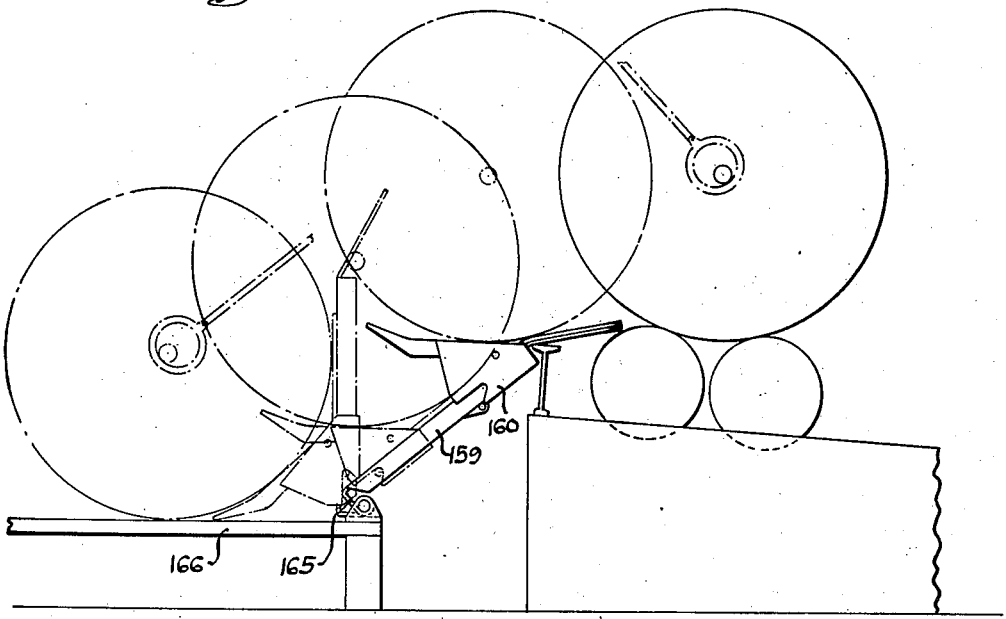

The means to support the roll after it has been ejected from the valley between the drums are here substantially the same as those previously described. As shown in Fig. 21 ways 155 are pivoted at their lower ends at 156 and are provided with a slidable carriage 157 having a flexible apron 158 that lies on the ways. When carriage 157 has descended to the floor level, the ways may be turned on their pivots and the roll may thus be delivered to the floor. If it is desired to deliver the roll to a truck, then the expedient shown in Fig. 27 may be resorted to. As here shown, ways 159 are provided with a slidable carriage 160 as before, but the lower end of the ways is carried by an angular support 161 which is pivoted at 162. The ways are also provided with a stop 163 to limit the downward descent of the carriage, so that when said carriage has reached its lower limit as defined by stop 163 it will be just at the right height to deliver the roll to a truck 164 when the ways are turned on pivot 162. In Fig. 28 the construction is substantially the same as in Fig. 27 except that the angular support 165 for the ways is shorter than the corresponding member 161 in Fig. 27, and the roll is here unloaded on a platform 166 instead of on a truck.

In Figs. 29 and 30 is shown a further modification of the ejecting mechanism. In this instance, arms 167 are mounted rigidly at the top of the framework of the machine, and three pulleys or sheaves 168, 169 and 170 are provided over which the flexible connections 171 extend from reservoir or reel 172. The outer ends of the flexible connections are provided with rings 173 to engage winding shaft 174. It will be seen that, as before, the flexible connections are so biased that when a pull is exerted on them by reel 172, the roll of material is pulled out of the machine, and that, when the flexible connections are paid out, the roll may be lowered out of the machine. Any suitable means may be employed to rotate reel 172 in either direction.

I claim:

1. In a winding machine, two surface winding drums spaced apart and rotatable in the same direction, a winding shaft to be placed in the valley between the drums to accumulate a roll of wound material, bearings to sustain said winding shaft in the valley between the drums, and ejecting means, independent of the bearings, to move said winding shaft and roll out of the valley first upwardly and outwardly with respect to one of said drums whilst said roll is in contact with the surface of said drum, and then, when the roll passes the crest of the drum, to control, while admitting of, further outward movement of said shaft and roll with the latter in contact with the surface of the drum.

2. In a winding machine, two surface winding drums spaced apart and rotatable in the same direction, a winding shaft to be placed in the valley between the drums to accumulate a roll of wound material, bearings to sustain said winding shaft in the valley between the drums, and ejecting means, including flexible connections to engage opposite ends of the shaft, to move said winding shaft and roll out of the valley first upwardly and outwardly with respect to one of said drums whilst said roll is in contact with the surface of said drum, and then, when the roll passes the crest of the drum, to control, while admitting of, further outward movement of said shaft and roll with the latter in contact with the surface of the drum.

3. In a winding machine, two surface winding drums spaced apart and rotatable in the same direction, a winding shaft to be placed in the valley between the drums to accumulate a roll of wound material, bearings to sustain said winding shaft in the valley between the drums, and ejecting means, including flexible connections to engage opposite ends of the shaft, to move said winding shaft and roll out of the valley first upwardly and outwardly with respect to one of said drums whilst said roll is in contact with the surface of said drum, and then, when the roll passes the crest of the drum, to control, while admitting of, outward and downward descent of said shaft and roll with the latter in contact with the surface of the drum.

4. In a winding machine, two surface winding drums spaced apart and rotatable in the same direction, a winding shaft to be placed in the valley between the drums to accumulate a roll of wound material, flexible ejecting means for the shaft and roll, and reversible actuating means which when moved in one direction cause the ejecting means to move the shaft and roll out of the valley upwardly and outwardly with respect to one of said drums whilst said roll is in contact with the surface of said drum, and which when moved in the other direction cause the ejecting means, while retaining control of the shaft and roll, to allow further outward movement of said shaft and roll beyond the crest of the drum with the roll in contact with the surface of the drum.

5. The combination with a pair of surface winding drums spaced apart and rotatable in the same direction, and a winding shaft to rest in the valley between the drums; of a way inclined outwardly and downwardly from one of said drums, flexible ejecting means, for the winding shaft and its accumulated material, so biased that, when said flexible means are taken up, the winding shaft is moved upwardly and outwardly with respect to the drum that is adjacent the way whilst the accumulated material of said winding shaft is in contact with the surface of said drum, and, when thereafter said flexible means are paid out, downward movement of the winding shaft will take place whilst said accumulated material is in contact with the surface of the way, and means to take up and pay out the flexible means.

6. The combination with a pair of surface winding drums spaced apart and rotatable in the same direction, and a winding shaft to rest in the valley between the drums; of a way inclined outwardly and downwardly from one of said drums, ejecting members to engage opposite ends of the shaft, flexible means, connected to the ejecting members, so biased that, when said flexible means are taken up, the winding shaft is moved upwardly and outwardly with respect to the drum that is adjacent the way whilst the accumulated material of said winding shaft is in contact with the surface of said drum, and, when thereafter said flexible means are paid out, downward movement of said winding shaft will take place whilst said accumulated material is in contact with the surface of the way, and means to take up and pay out the flexible means.

7. The combination with a pair of surface winding drums spaced apart and rotatable in the same direction, and a winding shaft to rest in the valley between the drums; of a way inclined outwardly and downwardly from one of said drums, ejecting means, for the winding shaft and its accumulated material, so biased that, when a pull is exerted on said means the winding shaft is moved upwardly and outwardly with respect to the drum that is adjacent the way whilst the accumulated material of said winding shaft is in contact with the surface of said drum, and, when thereafter said pull is relieved, downward movement of the winding shaft will take place whilst said accumulated material is in contact with the surface of the way, and means to pull and relieve said means.

8. In a winding machine, two surface winding drums spaced apart and rotatable in the same direction, a winding shaft to be placed in the valley between the drums to accumulate a roll of wound material, ejecting means to move the roll out of the valley between the drums, a biasing member for said ejecting means, and operating means to actuate the ejecting means and to position the biasing member.

9. In a winding machine, two surface winding drums spaced apart and rotatable in the same direction, a winding shaft to be placed in the valley between the drums to accumulate a roll of wound material, flexible ejecting means to move the roll out of the valley between the drums, a biasing member for said flexible means, and operating means to take up and pay out the flexible means and to position the biasing member.

10. In a winding machine, two surface winding drums spaced apart and rotatable in the same direction, a winding shaft to be placed in the valley between the drums to accumulate a roll of wound material, means to exert a thrust against the winding shaft to thereby eject the roll from the valley between the drum, and flexible restraining means to engage the winding shaft and paid out in timed relation with the action of the thrusting means.

11. In a winding machine, two surface winding drums spaced apart and rotatable in the same direction, a winding shaft to be placed in the valley between the drums to accumulate a roll of wound material, a riding roller mechanism, and an ejecting device, to remove the roll from the valley between the drums, carried by the riding roller mechanism.

12. In a winding machine: a winding drum to support, at one side of its crest, a roll of wound material having core-engaging means; stationary guides to coact with the core-engaging means throughout the winding operation; and a combined ejecting and controlling device, independent of said guides, to first move the roll of wound material over the crest of the drum while maintaining said roll in contact with the surface thereof, and to thereafter control downward movement of the roll from the crest of the drum on its surface at the other side thereof.

13. In a winding machine: a winding drum to support, at one side of its crest, a roll of wound material having core-engaging means; stationary guides to coact with the core-engaging means throughout the winding operation; a way located adjacent the other side of the crest of the drum and downwardly inclined with respect thereto; and a combined ejecting and controlling device, independent of said guides, to first move the roll of wound material over the crest of the drum while maintaining said roll in contact with the surface thereof, and to thereafter control downward movement of the roll from the crest of the drum on the inclined way.

14. In a winding machine: a winding drum to support, at one side of its crest, a roll of wound material; flexible ejecting and controlling means, for the roll of wound material, so biased that, when a pull is exerted on said flexible means, the roll of wound material is moved upwardly over the crest of the drum while remaining in contact with the surface thereof, and when thereafter said flexible means are paid out, restrained downward movement of said roll from the crest of the drum and on its surface at the other side thereof will take place; and means to take up and pay out the flexible means.

15. In a winding machine: a winding drum to support, at one side of its crest, a roll of wound material; a way located adjacent the other side of the crest of the drum and downwardly inclined with respect thereto; flexible ejecting and controlling means for the roll of wound material, so biased that, when a pull is exerted on said flexible means, the roll of wound material is moved upwardly over the crest of the drum while maintaining said roll in contact with the surface thereof, and when thereafter said flexible means are paid out, restrained downward movement of said roll from the crest of the drum on the inclined way will take place; and means to take up and pay out the flexible means.

16. In a winding machine: a winding drum to support, at one side of its crest, a roll of wound material having core-engaging means; ejecting members to engage opposite ends of the core-engaging means; flexible means, connected to the ejecting members, so biased that, when a pull is exerted on said flexible means, the roll of wound material is moved upwardly over the crest of the drum while maintaining said roll in contact with the surface thereof, and when thereafter said flexible means are paid out, restrained downward movement of said roll from the crest of the drum and on its surface at the other side thereof; and means to take up and pay out the flexible means.

17. In a winding machine: a winding drum to support, at one side of its crest, a roll of wound material having core-engaging means; a way located adjacent the other side of the crest of the drum and downwardly inclined with respect thereto; ejecting members to engage opposite ends of the core-engaging means; flexible means, connected to the ejecting members, so biased that, when a pull is exerted on said flexible means, the roll of wound material is moved upwardly over the crest of the drum while maintaining said roll in contact with the surface thereof, and when thereafter said flexible means are paid out, restrained downward movement of said roll from the crest of the drum on the inclined way will take place; and means to take up and pay out the flexible means.

18. An unloading device for an object to be lowered including: an inclined way, a carriage movable on the way, an upstanding support on the carriage and an apron, also mounted on the carriage, but arranged to lie on the way, said support and apron forming a cradle to receive the object and said object acting, by increasing the frictional resistance between the way and the apron, to retard the descent of the carriage on the way.

19. An unloading device for an object to be lowered including: an inclined way, a carriage movable on the way and counterweighted to retard its descent on the way, an upstanding support on the carriage and an apron, also mounted on the carriage, but arranged to lie on the way, said support and apron forming a cradle to receive the object and said object acting by increasing the frictional resistance between the way and the apron, to additionally retard the descent of the carriage on the way.

20. An unloading device for an object to be lowered including: an inclined way, a carriage movable on the way, an upstanding support on the carriage, an apron, also mounted on the carriage, but arranged to lie on the way, said support and apron forming a cradle to receive the object and said object acting by increasing the frictional resistance between the way and the apron, to retard the descent of the carriage on the way, and means, extraneous of the carriage, to engage the object and to resist the descent of the carriage.

21. An unloading device for an object to be lowered including: an inclined way, a carriage movable on the way and counterweighted to retard its descent on the way, an upstanding support on the carriage, an apron, also mounted on the carriage, but arranged to lie on the way, said support and apron forming a cradle to receive the object and said object acting, by increasing the frictional resistance between the way and the apron, to additionally retard the descent of the carriage on the way, and means, extraneous of the carriage, to engage the object and to resist the descent of the carriage.

22. The combination with a surface winding drum to sustain a roll of wound material; of a support adjacent said drum; and a way pivotally and slidably mounted to thereby occupy at will an inclined operative position with its upper end resting on the support or an inoperative recumbent position out of engagement with said support.

23. In a winding machine, surface winding means to support a roll of wound material, an inclined way adjacent the winding means, a carriage to receive the roll of wound material and movable on the way, ejecting means to move the roll of wound material from the surface winding means to the carriage and to retain control of said roll to thereby resist the descent of the carriage, and means controlled by the weight of the roll of wound material to retard the descent of the carriage.

24. In a winding machine, surface winding means to support a roll of wound material, an inclined way adjacent the winding means, a carriage to receive the roll of wound material and movable on the way, ejecting means to move the roll of wound material from the surface winding means to the carriage and to retain control of said roll to thereby resist the descent of the carriage, means controlled by the weight of the roll of wound material to retard the descent of the carriage, and counterweighting means associated with the carriage to additionally resist the downward descent of said carriage.

25. The combination with a pair of surface winding drums spaced apart and rotatable in the same direction, and a winding shaft to rest in the valley between the drums; of flexible ejecting means, for the winding shaft and its accumulated material, including: control members sustained in a plane above the drums and outwardly beyond the crest of one of said drums, two ejecting members to engage opposite ends of the shaft, a hoisting device interposed between the control members and the ejecting members, vertically extending suspending means for the control members, and upwardly and outwardly slanting guys anchored at their upper ends and connected at their lower ends to the control members.

26. The combination with a pair of surface winding drums spaced apart and rotatable in the same direction, and a winding shaft to rest in the valley between the drums; of flexible ejecting means, for the winding shaft and its accumulated material, including: control members sustained in a plane above the drums and outwardly beyond the crest of one of said drums, two ejecting members to engage opposite ends of the shaft, a hoisting device interposed between the control members and the ejecting members, vertically extending suspending means for the control members, upwardly and outwardly slanting guys anchored at their upper ends and connected at their lower ends to the control members, and upwardly and inwardly slanting guys anchored at their upper ends and connected at their lower ends to the control members.

27. The combination with a pair of surface winding drums spaced apart and rotatable in the same direction, and a winding shaft to rest in the valley between the drums; of a way inclined outwardly and downwardly from one of said drums, ejecting members to engage opposite ends of the shaft, means, connected to the ejecting members, so biased that, when a pull is exerted on said means, the winding shaft is moved upwardly and outwardly with respect to the drum that is adjacent the way while the accumulated material of said winding shaft is in contact with the surface of said drum, and, when thereafter said pull is relieved, downward movement of said winding shaft will take place while said accumulated material is in contact with the surface of the way, and means to pull and relieve said means.

28. The combination with a pair of surface winding drums spaced apart and rotatable in the same direction, and a winding shaft to rest in the valley between the drums; of ejecting means, for the winding-shaft and its accumulated material, including: control members sustained in a plane above the drums and outwardly beyond the crest of one of said drums, two ejecting members to engage opposite ends of the shaft, a hoisting device interposed between the control members and the ejecting members, vertically extending suspending means for the control members, and upwardly and outwardly slanting guys anchored at their upper ends and connected at their lower ends to the control members.

29. The combination with a pair of surface winding drums spaced apart and rotatable in the same direction, and a winding shaft to rest in the valley between the drums; of ejecting means, for the winding shaft and its accumulated material, including: control members sustained in a plane above the drums and outwardly beyond the crest of one of said drums, two ejecting members to engage opposite ends of the shaft, a hoisting device interposed between the control members and the ejecting members, vertically extending suspending means for the control members, upwardly and outwardly slanting guys anchored at their upper ends and connected at their lower ends to the control members, and upwardly and inwardly slanting guys anchored at their upper ends and connected at their lower ends to the control members.

30. In a winding machine, surface winding means to support a roll of wound material, an inclined way adjacent the winding means, a carriage to receive the roll of wound material and movable on the way, ejecting means to move the roll of wound material from the surface winding means to the carriage and to retain control of said roll to thereby resist the descent of the carriage, means controlled by the weight of the roll of wound material to retard the descent of the carriage, and means to admit of backward tilting of the way and carriage, so that when the latter is near the lower end of the way, the roll can thereby be delivered therefrom.

31. In a winding machine: a winding drum to support a roll of wound material at one side of its crest; two biasing members, one at each side of the machine; flexible connections to eject the roll over the crest of the drum, passing over said biasing members; and means to take up and pay out said flexible connections.

32. In a winding machine: a winding drum to support a roll of wound material at one side of its crest; two biasing members, pivotally supported, one at each side of the machine; flexible connections, to eject the roll over the crest of the drum, passing over said biasing members; and means to take up and pay out said flexible connections.

33. In a winding machine: surface winding means including a drum to support, at one side of its crest, a roll of wound material; a downwardly inclined way located adjacent the other side of the crest of the drum; a carriage slidable on the way; means to eject the roll of wound material over the crest of the drum to thereby place it on the carriage; and a latch to retain the carriage in its upper position on the way but released by the arrival of a roll of wound material on the carriage to thereby permit descent of the carriage on the way.

34. In a winding machine: surface winding means including a drum to support, at one side of its crest, a roll of wound material; a downwardly inclined way located adjacent the other side of the crest of the drum; a carriage slidable on the way; means to eject the roll of wound material over the crest of the drum to thereby place it on the carriage; a latch to retain the carriage in its upper position on the way but released by the arrival of a roll of wound material on the carriage to thereby permit descent of the carriage on the way; and means to admit of backward tilting of the way and carriage, so that when the latter is near the lower end of the way the roll can thereby be delivered therefrom.

35. In a winding machine: surface winding means including a drum to support, at one side of its crest, a roll of wound material; a downwardly inclined way located adjacent the other side of the crest of the drum; a carriage slidable on the way; a combined ejecting and controlling device to first move the roll of wound material over the crest of the drum while maintaining said roll in contact with the surface thereof, and to thereafter place the roll on the carriage while retaining control of said roll; and means to admit of backward tilting of the way and carriage, so that when the latter is near the lower end of the way the roll can thereby be delivered therefrom.

36. In a winding machine: surface winding means including a drum to support, at one side of its crest, a roll of wound material; a downwardly inclined way located adjacent the other side of the crest of the drum; a carriage slidable on the way; a combined ejecting and controlling device to first move the roll of wound material over the crest of the drum while maintaining said roll in contact with the surface thereof, and to thereafter place the roll on the carriage while retaining control of said roll; and a latch to retain the carriage in its upper position on the way but released by the arrival of a roll of wound material on the carriage to thereby permit descent of the carriage on the way.

37. In a winding machine: surface winding means including a drum to support, at one side of its crest, a roll of wound material; a downwardly inclined way located adjacent the other side of the crest of the drum; a carriage slidable on the way; a combined ejecting and controlling device to first move the roll of wound material over the crest of the drum while maintaining said roll in contact with the surface thereof, and to thereafter place the roll on the carriage while retaining control of said roll; a latch to retain the carriage in its upper position on the way but released by the arrival of a roll of wound material on the carriage to thereby permit descent of the carriage on the way; and means to admit of backward tilting of the way and carriage, so that when the latter is near the lower end of the way the roll can thereby be delivered therefrom.

Signed at the borough of Brooklyn, county of Kings, city and State of New York, this 20th day of April, 1931.

JAMES A. CAMERON.